Sept. 1, 1953 W. L. MARTIN ET AL 2,650,955
TRANSFORMER-COUPLED PULSE-TRAIN AMPLIFIER
Filed Jan. 9, 1951 3 Sheets-Sheet 1

INVENTOR.
William L. Martin
Ralph J. Slutz
Henry R. Senf
BY Max L. Libman
ATTORNEY Sept. 1, 1953     W. L. MARTIN ET AL     2,650,955
TRANSFORMER-COUPLED PULSE-TRAIN AMPLIFIER
Filed Jan. 9, 1951     3 Sheets-Sheet 2
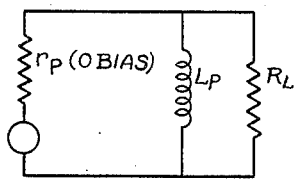
$L_P$ CHARGE
*Fig. 6-A*
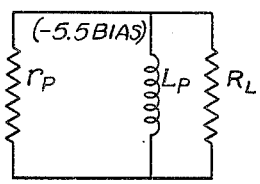
$L_P$ DISCHARGE
*Fig. 6-B*
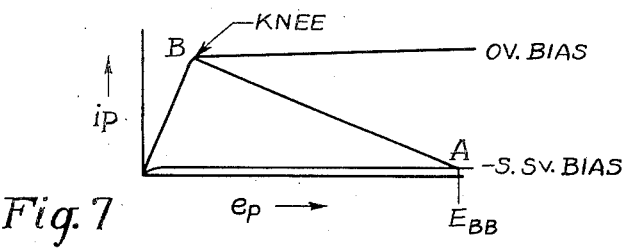
*Fig. 7*
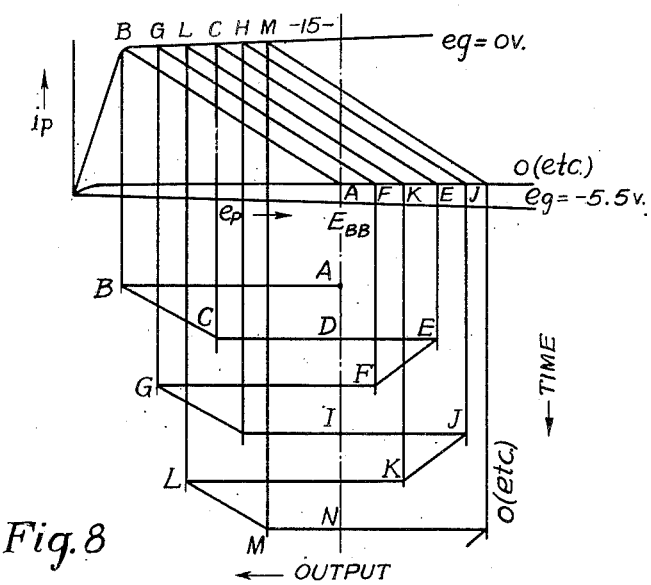
*Fig. 8*
INVENTOR.
William L. Martin
Ralph J. Slutz
Henry R. Senf
BY Max L. Libman
ATTORNEY Sept. 1, 1953 W. L. MARTIN ET AL 2,650,955
TRANSFORMER-COUPLED PULSE-TRAIN AMPLIFIER
Filed Jan. 9, 1951 3 Sheets-Sheet 3

INVENTOR.
William L. Martin
Ralph J. Slutz
Henry R. Senf
BY Max L. Libman
ATTORNEY Patented Sept. 1, 1953

2,650,955

UNITED STATES PATENT OFFICE 2,650,955

TRANSFORMER-COUPLED PULSE-TRAIN AMPLIFIER

William L. Martin, Los Angeles, Calif., and Ralph J. Slutz, Kensington, and Henry R. Senf, Bethesda, Md., assignors to the United States of America as represented by the Secretary of Commerce Application January 9, 1951, Serial No. 205,164

3 Claims. (Cl. 179—171)

(Granted under Title 35, U. S. Code (1952), sec. 266)

The invention described herein may be manufactured and used by or for the Government of the United States for governmental purposes without the payment to us of any royalty thereon in accordance with the provisions of the act of March 3, 1883, as amended (45 Stat. 467: 35 U. S. C. 45).

This invention relates to an amplifier for high-speed electric pulses, and more particularly for trains of such pulses, and has for its primary object the provision of a high-efficiency transformer-coupled amplifier stage for accurately reproducing either isolated pulses or trains of time-spaced pulses. Such pulses have many applications in high-speed electronic circuitry and are of particular interest in connection with modern high-speed electronic digital computers, where the pulse repetition rates may be in the order of one to several million pulses per second.

An example of a device using this invention is found in the electronic computer completed in March 1950, at the National Bureau of Standards, and known as the SEAC (National Bureau of Standards Eastern Automatic Computer). In this computer the problem arose of amplifying weak input pulses having a voltage rise in the order of 7.5 volts, a duration in the order of 0.5 microsecond, and a repetition rate of one megacycle. Engineering considerations had provisionally determined the use of transformer-coupled stages. Conventional amplification practice with transformer-coupled stages produced distorted pulses having a drooping top and a wide variation in amplitude of successive pulses (as will be described in more detail below) when it was attempted to achieve reasonably high output efficiency. It is an object of this invention to overcome such difficulties by operating the transformer-coupled amplifier stage in the region of "plate bottoming," i. e., below the knee of the plate voltage-current characteristic of the amplifier tube. Such operation would ordinarily be considered undesirable as leading to distortion of the output, but it will be shown that the nonlinearity produced by this operation compensates other undesirable output characteristics of the circuit employed so that the full advantages of transformer coupling can be realized, together with the necessary uniform amplitude and flat-topped pulse configuration essential to proper operation of pulse-sensitive devices such as digital computers.

Another difficulty inherent in the operation of the above-described type of pulse amplifier results from the nonuniformity of the vacuum tubes available. Some tubes are much better performers than others, and these so-called "hot tubes" will produce as much as twice as great a pulse output (in amplitude) as the poorest tubes. However, too high an output amplitude may result in overloading or overdriving some of the succeeding stages, while too low an amplitude will not produce a signal adequate to operate the next stage. It is an advantage of this invention that it tends to equalize the output from "hot" and "cold" tubes, thus producing the essentially uniform pulses which are most desirable for use in computers.

Other objects and advantages of the invention will become apparent by reference to the detailed description below and to the accompanying drawings, in which:

Figures 6A and 6B are respective charge and discharge circuits for the same system shown in Figure 5;

Figure 7 is an idealized characteristic curve showing operation at a particular grid bias;

Figure 8 shows the operating conditions without plate bottoming;

Figure 1:
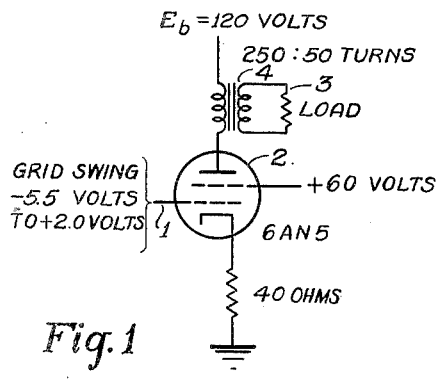
Figure 1 is a circuit diagram of the basic circuit employed.
Figure 2:
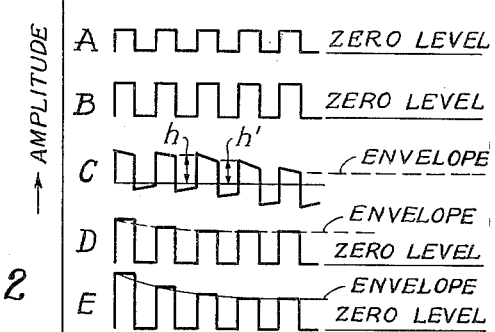
Figure 2 is a graph showing the relationship of various groups of pulses.

Figure 1 shows the basic elements of a typical pulse-amplifying stage. Pulses such as shown at A, Figure 2, are fed in on lead I to the grid of tube 2. It is desired to produce, at the secondary of pulse transformer 3, amplified pulses of approximately the character shown at B in Figure 2. Instead, in practice, the output pulses are of the general nature shown at C. The reason for this was not understood for some time, but it is an important feature of this invention that it points out the nature of the difficulty as well as indicating the solution.

It is to be understood that the amplifier stage disclosed will not always be passing a train of pulses such as is shown in Figure 2. If a single pulse is passed, it will be correctly amplified, as indicated by the left-hand C pulse in Figure 2. If the circuit operation calls for a train of pulses, as often occurs, for example, in the operation of a digital computer, then the pulses would successively degenerate in shape and amplitude until an equilibrium condition is reached where the negative part of each pulse (below the zero level) is approximately equal in area to the positive part, while the amplitude of the positive part is considerably less than that of the first pulse in the train. Pulses that occur after the equilbrium condition is attained will be called "$n$th" pulses. Instead of having a fairly flat top, the pulses have a top which "droops" from an initial value of $h$ to a lower value (of $h'$). The effective value of the pulse is determined by the minimum amplitude, (which is, of course, lower for the "$n$th" pulses than for the first) because the pulses are used for triggering of electronic circuits, so that if the trailing edge of the pulse is too low in amplitude, the drooping pulse may be insufficient to perform the necessary triggering operation, leading to incorrect operation in the case of a computer or of any electronic control device using pulses in this fashion. It is therefore desirable that the pulses be of as nearly constant amplitude as possible.

The above-described inefficient pulse train reproduction results from operation of the system of Figure 1 according to what would previously have been considered good circuit practice with the initial load line intersecting the characteristic curve at or above the knee, as will be further explained below.

It will be understood, of course, that pulse amplification can be obtained in various known ways, without recourse to output transformer coupling. The use of pulse transformers, however, provides a number of considerable advantages, including proper impedance matching, direct-current voltage isolation, etc., which permit more economical, efficient, and reliable operation. These are all important factors in such a complex device as a digital computer, which normally employs thousands of tubes or tube equivalents. The use of transformers also enables the same level of performance to be obtained which would otherwise require more vacuum tubes. This is of particular importance in these complex devices, because an increase in the number of tubes increases the likelihood of tube failure during any operation; and it can be demonstrated that, with a given reliability of tube within the range of current practice, a point will be reached where, if there are too many tubes (or other failure-liable components) in a given circuit, the circuit will seldom be able to perform a complex series of operations without at least one failure, which will, of course, invalidate the entire result. It therefore becomes not merely desirable, but in some cases absolutely essential to reduce the number of failure-liable elements to the point where failures occur very infrequently, in order to obtain a practicable device. A transformer is very much less liable to failure than a vacuum tube. However, in attempting to use transformers, the above-described difficulties were found to occur, and the resulting inefficiency of operation threatened to offset the anticipated gains, since if more amplification were to be required, the expected gain in efficiency or saving in the number of tubes required, would be lost.

Figure 3:
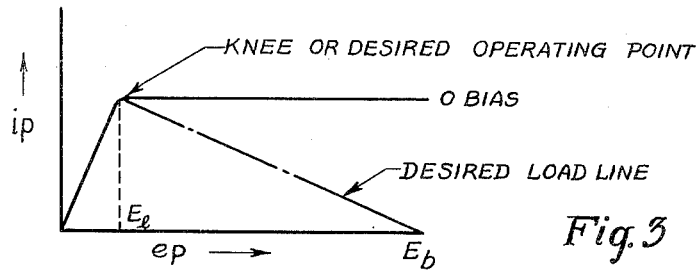
Figure 3 is an idealized characteristic curve of a vacuum tube, showing a desired mode of operation.

The type of tube used (6AN5) has an idealized zero-bias plate characteristic curve of the general configuration shown in Figure 3. It is known that maximum peak power can be obtained from a tube having this characteristic by loading it so that the operating point is at the knee of the curve. An apparent load-line is thus defined which intersects the operating point. That is, if the plate voltage with the tube at cut-off is $E_b$, when the tube is loaded, the load drop should be such that the plate voltage drops to $E_1$ for maximum output power. Operation at a point below the knee (that is, at a lower value of $E_1$) is called "bottoming."

The particular grid-bias voltages and tube shown in Figure 1 are determined by general considerations. For example, a miniature tube is desirable for fast operation (which is very important in this type of application) because of low capacitance of leads, tube elements, and sockets. A plate-loaded tube operated for maximum power output gives a considerable voltage amplification from its grid to its plate circuit. In computer circuitry such as is used in SEAC only about a factor of two in voltage amplification is needed to allow for clipping off noise and variations due to droop or attenuation in delay lines. On the other hand, large output currents are desired to drive many loads in multiple and to charge rapidly the large wire capacitances. A pulse transformer with a step-down ratio permits this exchange of voltage for current. Moreover it is desirable to use the low voltage signals of the grid circuit in the germanium diode gating circuits because the germanium diodes will stand only about 40 volts in the reverse direction. Low filament power requirement is of importance in large-scale application where hundreds or thousands of tubes are used, as in a computer. Such considerations dictate the type of tube.

Figure 10:
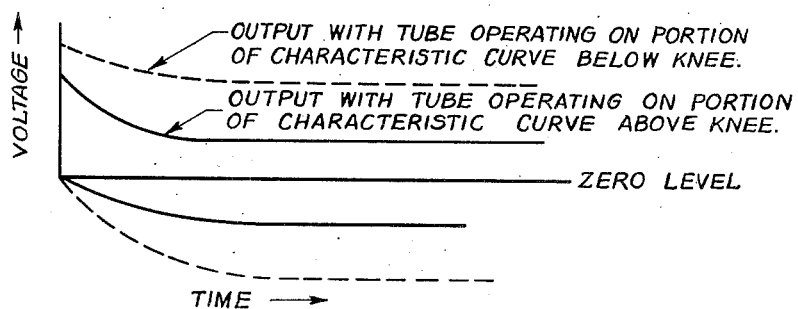
Figure 10 shows the relative envelopes for tubes operating under the conditions of Figures 8 and 9, respectively.

If the circuit of Figure 1 is operated under conditions of normally good practice, i. e., on or above the knee of the curve, when a train of pulses such as is shown at A in Figure 2 is introduced at the grid 1 of tube 2, the output is a train of pulses, such as is shown at C. This does not represent the efficient performance desired or expected. The reason for the deterioration in pulse amplitude is that the energy stored in transformer 4 during any of the first few pulses is not dissipated between pulses. This causes a gradual biasing of the transformer until it reaches a new equilibrium. Pulses that occur after this new equilibrium is established are called "$n$th" pulses. During this new equilibrium all pulses are amplified equally, but during the period between the first pulse and the $n$th pulse, the stage-amplification characteristics may be decreased as much as 50 percent. This is indicated in Figure 10 by the solid line above the zero level.

Unless some form of direct-current restoration is used, it is impossible to utilize that part of a pulse appearing below the static or zero signal level of the output (see Figure 2C). The most practical forms of direct-current restoration result in a spurious output (extra pulse) after a series of pulses has passed, which is not permissible for pulse-counting applications such as computer work. For a series of pulses, the minimum positive amplitude, as previously explained is determined by the trailing edge of an $n$th pulse, as this is the maximum amplitude that may be depended upon to operate the succeeding circuit. To increase the usable output it is necessary to decrease the droop during a pulse and also the droop that exists in the envelope during a series of pulses.

Figure 4:
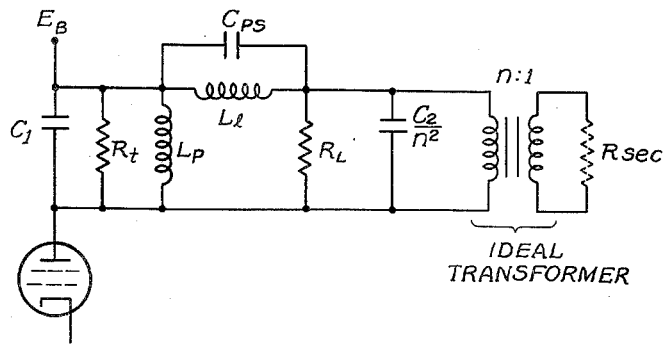
Figure 4 is a simplified equivalent circuit of a pulse transformer stage, with all values referred to the primary.

To analyze the cause of these distortions it is necessary to examine the plate characteristic curve of the 6AN5 tube and the circuit behavior of the coupled transformer. Figure 4 is a simplified equivalent circuit of a pulse transformer with all values referred to the primary.

$R_t$=resistor representing transformer losses
$C_1$=primary circuit capacitance
$L_p$=primary inductance
$C_{ps}$=primary to secondary capacitance
$L_l$=leakage inductance
$R_L$=load transferred to primary=$(R \sec) n^2$
$C_2/n^2$=secondary capacitance transferred to primary.

For the purposes of this discussion, the circuit capacitances and the transformer leakage reactance can be omitted because neither pulse rise nor fall transients are of concern. The chief effects of these capacitances and the leakage reactance are to cause slower rise and fall in individual pulses and to cause oscillations in the output. Also for the sake of simplification, the effects of transformer loss may be lumped with $R_L$.

Figure 5:
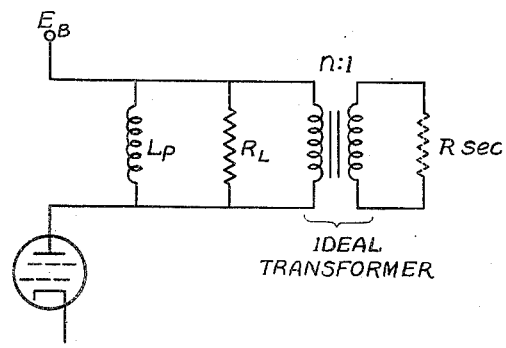
Figure 5 is a further simplified pulse transformer stage circuit.

This further simplified circuit appears in Figure 5.

During any pulse the tube conducts, and current through $L_p$ increases. When the pulse ends, this current in $L_p$ continues to flow, but its only path is through $R_L$ rather than through the tube. Thus, after each pulse, the current through $R_L$ reverses, and an inductive "backlash" followed by an exponential decay, as determined by $L_p$ and $R_L$, appears in the output. Because the duty factor is about 50 percent, the additional current in $L_p$ cannot decrease to zero between pulses. Therefore, in a train of pulses, the current in $L_p$ will build up until its increase during each pulse is equal to its decrease between pulses. The equivalent charge and discharge circuits are shown in Figures 6A and 6B where $r_p$ is the plate resistance of the tube.

The $r_p$ of the average 6AN5 tube at about $-5.5$ volts bias is 60,000 ohms. In the discharge circuit $R_L$ will always be less than $r_p$: therefore $r_p$ can be omitted if desired. The $r_p$ at 0 volt bias depends on the portion of the characteristic curve on which the tube is being operated. Idealized plate characteristic curves are shown in Figure 7.

If the tube is operated above its knee, its $r_p$ is about 10,000 ohms; if it is operated below its knee, its $r_p$ is about 500 ohms.

As a 120-volt plate supply had been decided upon because of other circuit considerations, the load-line to the knee of the curve (A—B) of a low-limit tube is about 4000 ohms. The value of $R_L$ can be determined from the plate characteristic of any tube. Referring to Figure 3, $$R_L=(E_b-E_l)/i_p$$

It is well-known that the tube should be operated to its knee for maximum power output; assume that $R_L$ is about 4000 ohms. The normal mode of operation of the tube is shown in Figure 8. The plate stands at the plate supply voltage A and in the presence of a pulse swings to B. Examining the charge circuit in Figure 6A, it can be seen that current will start to increase in $L_p$ during the pulse. The effect of this current is to cause the plate to swing gradually to C during the pulse. The resultant droop in the amplitude of this individual pulse can be observed in the output pulses shown below the curve. By increasing $L_p$ the current build-up through $L_p$ during a pulse will be decreased and C will be closer to B.

The time constant characterizing droop is:

$$L_p\frac{(R_L+r_p)}{r_pR_L}$$

If this time constant could be increased, the droop would be decreased. Increasing $L_p$ or decreasing $r_p$, or doing both, would afford this benefit. $L_p$ can be increased by redesigning the transformer, and $r_p$ can be decreased by operating the tube below the knee of its characteristic curve.

Returning to Figure 8; during the pulse the plate moved to C. The trailing edge of the pulse then occurs, the tube stops conducting, and the plate swings to D; the increased current in $L_p$ can discharge only through $R_L$ and so causes the plate to swing to E. On the discharge circuit, Figure 6B (omitting $r_p$ as above) current in $L_p$ decreases as determined by the time constant, $L_p/R_L$. (It must be remembered that this is only an equivalent mode of operation because it ignores circuit capacitance on the pulse excursions).

Figure 9:
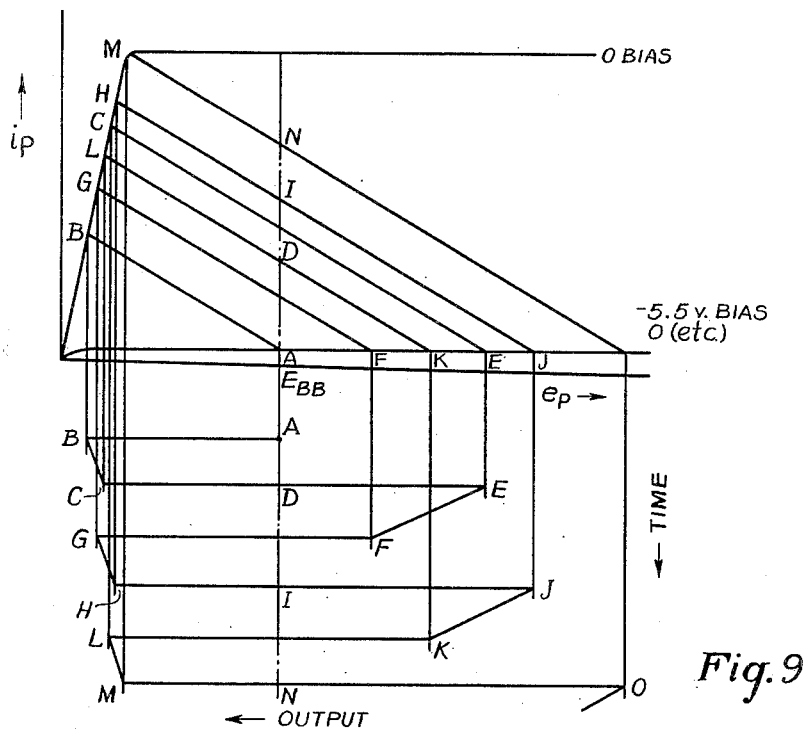
Figure 9 shows the improved operation produced by plate bottoming.

The plate swings to F before the next pulse occurs. The next pulse causes the plate to swing to G and so the cycles continue until the current increase during a pulse is equal to the current decrease between pulses. As this equilibrium determines the amplitude of the $n$th pulse (or the envelope droop) it would be desirable to use the zero-bias characteristic curve in that range for which minimum envelope droop occurs. We have found that by causing the tube to operate below the knee of its characteristic curve, so that the equilibrium position is just below the knee, envelope droop will be held to a minimum as will individual pulse droop. This is illustrated in the operation cycles shown in Figure 9. Here, an $R_L$ greater than 4000 ohms is used; that is, $R_L>(E_b-E_l)/n^2i_p$, where $n$ is the turns ratio of the pulse transformer, the $n^2$ term being added so that $R_L$ is referred to the primary of the transformer. When $R_L$ is greater than 4000 ohms the plate swings from A to B, where B is well below the knee of the curve. During the pulse, the droop that occurs is evaluated by the time constant $$\frac{L_p(R_L+r_p)}{r_pR_L}$$

as before but $r_p \ll R_L$; therefore the above time constant is about $L_p/r_p$ where $r_p$ is relatively small.

The cycles continue as previously described, but the load should be designed so that the equilibrium cycle takes place just below the knee.

The proper $R_L$ will depend upon the maximum duty cycle to which the tube is subjected. For the SEAC, a maximum duty cycle of 50 per cent was set. After $n$th-pulse equilibrium is established the time integral of output, $$\int_{t_p}^{t_{(p+1)}} E dt$$

over one pulse period is equal to zero. Therefore the amplitude of the negative output is about equal to the positive output. The current in $L_p$ during an $n$th pulse is thus about equal to the current in $R_L$. Assuming the current in $L_p$ does not decay between pulses, we find that the tube conducts twice the current supplied to the load, and the apparent load line is one-half the resistance of $R_L$. $R_L$ should be about twice the load line to the knee, or 8000 ohms. As the current in $L_p$ does decay between pulses, this requirement will be determined by the particular values of $L_p$ and $R_L$ involved, but $R_L$ must be between 4000 and 8000 ohms.

Figure 10 shows relative output envelopes for tubes operated above and below the knee. The useful output is above the zero level only.

It will thus be seen that by setting the load value so that initial operation is in the region of plate bottoming, the unexpected result is obtained that the amplitude deterioration between 1st and $n$th pulses is greatly diminished; that the individual pulse droop is minimized for a given value of inductance in the transformer; and that it becomes possible to obtain a higher output level for a train of pulses than with normal or "correct" operation.

What is claimed is:

1. A pulse-train repeater comprising a grid-controlled amplifier tube having a plate characteristic curve with a steep portion, a knee and an essentially horizontal portion; a pulse transformer having its primary connected in the plate circuit of said tube; a load circuit connected to the secondary of said transformer; and a load in said load circuit having an impedance so large as to cause the complete cycle of normal operation to be effectively within the region of the steep portion of the plate characteristic curve.

2. A pulse-train amplifier, comprising a grid-controlled amplifier tube having a pentode-type plate characteristic curve with a substantially constant-voltage portion; a transformer having its primary connected in the plate circuit of said tube, a load connected in the circuit of the secondary of said transformer, said load having an impedance sufficiently greater than the impedance represented by the load line drawn from the no-load point to the knee of the pentode-type plate characteristic curve to cause the complete cycle of normal operation of said tube to be effectively within the region of the substantially constant voltage portion of the plate-characteristic curve.

3. A pulse-train repeater, comprising a grid-controlled amplifier tube having a plate-characteristic curve with a substantially constant-voltage region and a substantially constant-current region; a pulse transformer having its primary connected in the plate circuit of said tube; a load circuit connected to the secondary of said transformer; and a load in said load circuit having an impedance sufficiently large to cause the complete cycle of normal operation of said tube to be effectively within the substantially constant-voltage region of the plate-characteristic curve.

WILLIAM L. MARTIN.
RALPH J. SLUTZ.
HENRY R. SENF.

References Cited in the file of this patent

UNITED STATES PATENTS

| Number | Name | Date |
|---|---|---|
| 2,416,111 | Maxwell | Feb. 18, 1947 |
| 2,471,819 | Kerhof | May 31, 1949 |

FOREIGN PATENTS

| Number | Country | Date |
|---|---|---|
| 126,289 | Australia | Mar. 27, 1945 |

OTHER REFERENCES

"RCA Receiving Tube Manual," pp. 16–23, published 1947 by Radio Corporation of America. (Copy in Div. 69.)

Valley and Wallman, "Vacuum Tube Amplifiers," McGraw-Hill, 1948, pp. 352–361.